(12) United States Patent
Shimotori et al.

(10) Patent No.: US 6,572,994 B1
(45) Date of Patent: Jun. 3, 2003

(54) POLYMER ELECTROLYTE FUEL CELL SYSTEM

(75) Inventors: Soichiro Shimotori, Yokohama (JP); Makoto Harada, Yokohama (JP); Kazuo Saito, Glastonbury, CT (US); Yasuji Ogami, Yokohama (JP); Atsushi Ohma, Yokohama (JP); Atsuo Sonai, Yokohama (JP); Michio Hori, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 184 days.

(21) Appl. No.: 09/604,045

(22) Filed: Jun. 26, 2000

Related U.S. Application Data

(63) Continuation of application No. PCT/JP99/05912, filed on Oct. 26, 1999.

(30) Foreign Application Priority Data

Oct. 26, 1998 (JP) .......................................... 10-304079

(51) Int. Cl.⁷ .............................. H01M 8/04; H01M 8/18
(52) U.S. Cl. ............................... 429/26; 429/17; 429/20
(58) Field of Search ................................ 429/17, 19, 20, 429/26

(56) References Cited

U.S. PATENT DOCUMENTS

| | | | | |
|---|---|---|---|---|
| 4,902,586 A | * | 2/1990 | Wertheim | 429/20 |
| 5,482,790 A | * | 1/1996 | Yamada et al. | 429/9 |
| 6,015,634 A | * | 1/2000 | Bonville et al. | 429/17 |
| 6,274,259 B1 | * | 8/2001 | Grasso et al. | 429/13 |
| 6,312,842 B1 | * | 11/2001 | Reiser et al. | 429/13 |

FOREIGN PATENT DOCUMENTS

| | | |
|---|---|---|
| DE | 198 02 490 A1 | 7/1999 |
| EP | 0 831 543 A1 | 3/1998 |
| JP | 3-295176 | 12/1991 |
| JP | 6-132038 | 5/1994 |
| JP | 6-231787 | 8/1994 |
| JP | 8-91804 | 4/1996 |
| JP | 8-185877 | 7/1996 |
| JP | 9-266002 | 10/1997 |
| JP | 10-223249 | 8/1998 |

OTHER PUBLICATIONS

K. Joon. Journal of Power Sources 71 (1998) 12–18. Fuel Cells–a 21st centruy power system.*
International Search Report Jan. 2000.

* cited by examiner

Primary Examiner—Carol Chaney
Assistant Examiner—Tracy Dove

(57) ABSTRACT

A fuel cell system comprising a fuel cell stack and a fuel reformer for reforming a fuel and supplying a reformed fuel to the fuel cell stack, further comprising a total enthalpy heat exchanger for exchanging heat and moisture between a reacted gas and an unreacted gas from the fuel cell stack, a separator for separating moisture from the fuel gas fed from the fuel cell stack or from an oxidant gas, and a mixer for mixing part of the moisture separated by the separator with a medium having a freezing point of 0° C. or less.

6 Claims, 12 Drawing Sheets

POLYMER ELECTROLYTE FUEL CELL SYSTEM

CROSS-REFERENCE TO RELATED APPLICATIONS

This is a continuation of Application No. PCT/JP99/05912, filed Oct. 26, 1999.

This application is based upon and claims the benefit of priority from the prior Japanese Patent Application No. 10-304079, filed Oct. 26, 1998, the entire contents of which are incorporated herein by reference.

BACKGROUND OF THE INVENTION

The present invention relates to a polymer electrolyte fuel cell system using an ion conductive solid polymer as an electrolyte.

Recently, fuel cells have been drawn attention by the reason that it may be used as a highly efficient energy conversion apparatus. Of them, attention is particularly focused on a so-called polymer electrolyte fuel cell (PEFC) which is to be used as a power supply source for space machinery and electric vehicles. This is because the PEFC employing a proton exchange membrane, can provide a high power density with a compact structure and be operated in a simple system.

A conventional PEFC system is shown in FIG. 1. The system comprises a polymer electrolyte fuel cell stack 100; a reformer 101 for reforming a fuel, which may be a carbohydrate such as methane and gasoline or an alcohol such as methanol, to produce a hydrogen-rich gas; a shift converter 102 for reducing CO contained in the hydrogen-rich gas; a selective oxidizer 103; a compressor 104 for supplying air as an oxidant; and a cooling-water tank 105 constituting a cooling system for supplying cooling water to remove heat generated by an electrochemical reaction. As the reformer 101, a steam reformer for reforming the fuel with water vapor and an auto thermal reformer are known. The auto thermal reformer is a combination of the steam reformer and a partial-oxidation reformer for reforming the fuel with air. The water vapor required for reforming the fuel is derived from water-vapor of an oxidant gas by separating it by means of a condenser 106. The water vapor is supplied to the reformer 101 by way of the cooling system.

Since the water vapor is recovered by the condenser 106 in the conventional polymer electrolyte fuel cell system, a tank is required for storing the recovered water, namely, pure water, resulting from the electrochemical reaction. The pure water, however, is frozen at 0° C. or less. A problem is caused particularly when the fuel cell system is installed in an electric automobile system which must be started up even in a cold region where the automobile system is exposed to an outside air temperature of −40° C.

To solve this problem, the following methods have been proposed. In the method disclosed in Japanese Patent Application KOKAI Publication No. 8-185877, an antifreeze is used as the cooling water, whereas pure water is produced by a water separator provided in the cooling system and used as humidifying water. In this method, freezing of the cooling water system is prevented. In addition, pure water can be used for humidification and as a steam for reformer. However, since the pure water is produced by the water separator and supplied by way of a pipe, the pipe is not only frozen at a below-zero environment but also blown out by expansion.

On the other hand, in the method disclosed in Japanese Patent Application KOKAI Publication No. 3-295176, a water absorbent such as calcium chloride or propylene glycol is supplied into an oxidant gas flowing passage within a cell. Water is recovered by the absorbent and then regenerated from the absorbent by a regenerator. In this method, since water is recovered in a vapor state in the oxidant gas flowing passage, a pure-water storage tank is not required. Furthermore, it is possible to minimize freezing of water by lowering the freezing point of the absorbent. However, there is no means for preventing the absorbent from mixing with the oxidant gas. As a result, the absorbent enters an electrode, interfering with an electrochemical reaction. In addition, since the water vapor is contained in an oxidant gas exhaust at a saturated vapor pressure, the generated water is not completely recovered.

The aforementioned problems will not be overcome, even if the methods disclosed in Japanese Patent Application KOKAI Publication Nos. 3-295176 and 8-185877 are combined, in other words, even if an absorbent also serving as an antifreeze is supplied to an oxidant gas flowing passage within the cell to recover water from the oxidant gas and the recovered water is regenerated by a regenerator, while an antifreeze is used as the cooling water, and pure water is produced by the water separator as the reforming vapor.

BRIEF SUMMARY OF THE INVENTION

An object of the present invention is to provide a polymer electrolyte fuel cell system capable of prevent water-freeze within the system even at a below-zero temperature and thereby enabling quick start-up of the system even in a below-zero environment.

To attain the aforementioned object, the present invention comprises a polymer electrolyte fuel cell stack;

a fuel reformer for reforming a fuel having a freezing point of 0° C. or less with water vapor by supplying the fuel and the water vapor to the fuel reformer, the fuel reformed being supplied to the fuel cell stack;

total enthalpy heat exchanging means for exchanging heat and moisture between a reacted gas fed from a reaction section of the fuel cell stack and an unreacted gas to be fed to the reaction section of the fuel cell stack;

separating means for separating the moisture from the reacted gas fed from the total enthalpy heat exchanging means;

mixing means for mixing part of the moisture separated by the separating means into the fuel;

fuel supply means for supplying the fuel to the mixing means; and solution mixture supply means for supplying part of the solution mixture prepared by the mixing means to the fuel reformer.

Since the separating means and the mixing means are discretely provided in the present invention, the separating means can be reduced in size. Therefore, even if the water stored in the separating means is frozen, the frozen water can be thawed in a short time. It follows that the start-up of the system is not adversely affected. In addition, if the ratio of water to space of the separating means is appropriately controlled, the oxidant gas exhaust can be led out even if water is frozen. The start-up operation of the system is not affected significantly.

Furthermore, since the total enthalpy heat exchanging means is provided for exchanging heat and moisture between the reacted gas fed from the reaction section of the fuel cell stack and the unreacted gas to be fed to the reaction section of the fuel cell stack, the content of the moisture in the exhaust can be drastically reduced. It follows that condensation of water in the exhaust gas flowing passage can be minimized, and water-freeze in the exhaust gas flowing passage can be substantially prevented.

In this case, if the separating means and the mixing means are integrated into one body, heat radiation can be minimized while the temperature of the mixing means can be maintained high. Alternatively, since a partition board is interposed between the separating means and the mixing means, methanol can be prevented from evaporating and entering into the oxidant gas.

Since the present invention employs the total enthalpy heat exchanging means, only one single methanol supply means is sufficient enough. As a result, the system will not be complicated and controlled in a simple manner.

Furthermore, it is possible to prevent the oxidant gas from mixing with undiluted methanol as a fuel. Since the oxidant gas is isolated by pure water from the undiluted methanol as the fuel, virtually no security means is required. As a result, the system will not be complicated and controlled in a simply manner.

To attain the aforementioned object, the present invention comprises a polymer electrolyte fuel cell stack;

a fuel reformer for reforming a fuel with water vapor by supplying the fuel and the water vapor to the fuel reformer, the fuel reformed being supplied to the fuel cell stack;

total enthalpy heat exchanging means for exchanging heat and moisture between a reacted gas fed from a reaction section of the fuel cell stack and an unreacted gas to be fed to the reaction section of the fuel cell stack;

solution mixture preparing means for preparing a solution mixture of water contained in the reacted gas which is fed from the total enthalpy heat exchanging means and a medium having a freezing point of 0° C. or less and a boiling point higher than water; and water vapor generating means for generating water vapor from the solution mixture prepared by the solution mixture preparing means.

According to the present invention, it is possible to lower the freezing point of the separated moisture by separating the moisture from the fuel gas which is fed from the fuel cell stack or separating from the oxidant gas exhaust and mixing at least part of the separated moisture with a medium which has a freezing point of 0° C. or less and a boiling point higher than water. Therefore, freezing of the separated moisture can be prevented. On the other hand, since the medium having a boiling point higher than water is employed, the medium can be prevented from being exhausted from the separator, together with the oxidant gas exhaust. Moreover, since different substances are used as the fuel and the medium, it is possible to prevent freezing of water even in a system employing a water-insoluble fuel such as gasoline.

The solution mixture preparing means may comprise separating means for separating moisture from the gas which is exhausted from the fuel cell stack and mixing means for mixing the medium into part of the water separated from the separating means.

Alternatively, the solution mixture preparing means may comprise the separating means for separating moisture from the gas which is exhausted from the fuel cell stack, and supply means for supplying the medium to the separating means.

Furthermore, the solution mixture preparing means comprises the mixing means for mixing part of the gas exhausted from the medium cell stack, with the fuel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, embodiments of the present invention will be explained with reference to the drawings.

Figure 1:
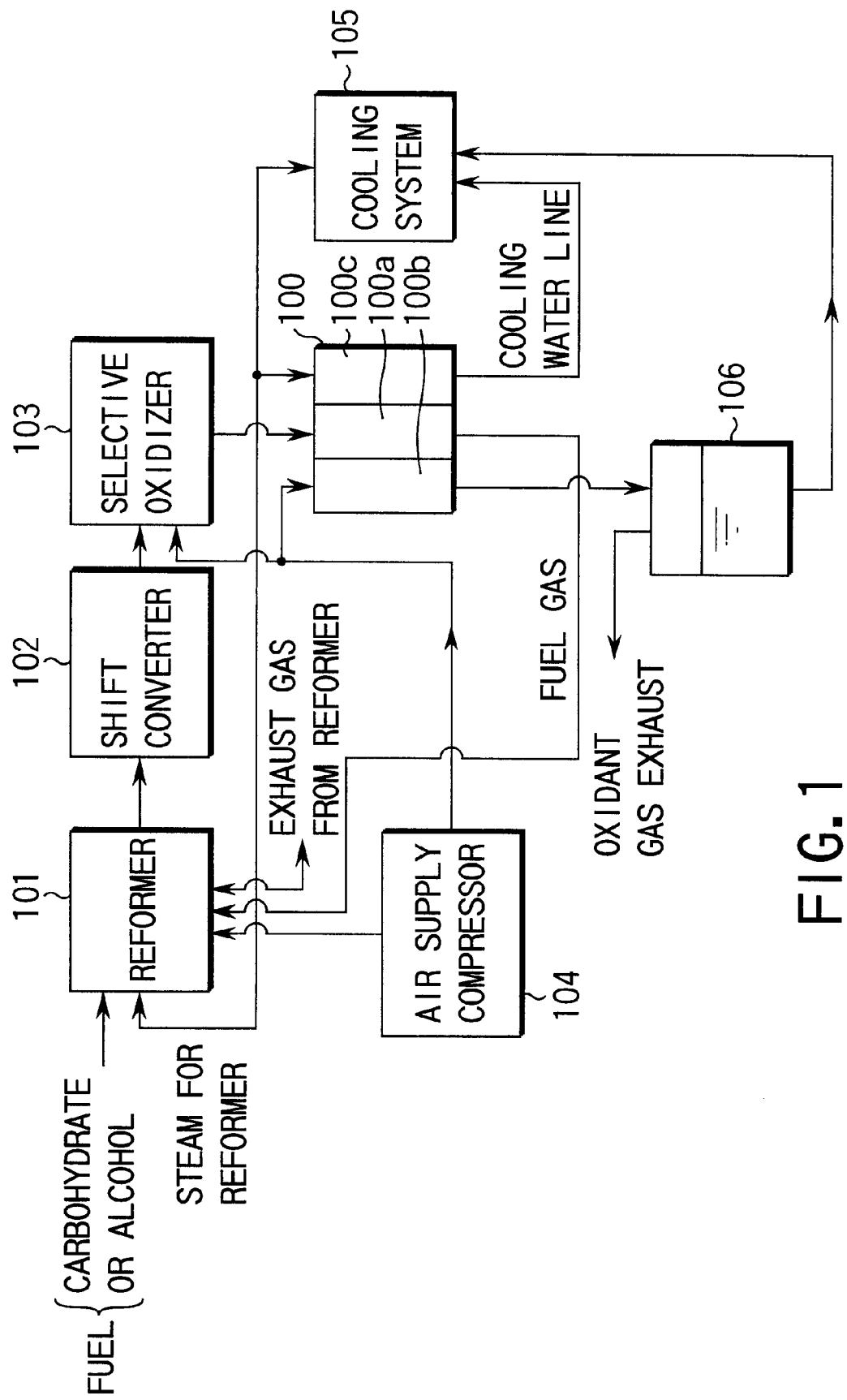
FIG. 1 is a view showing a structure of a conventional polymer electrolyte fuel cell system.
Figure 2:
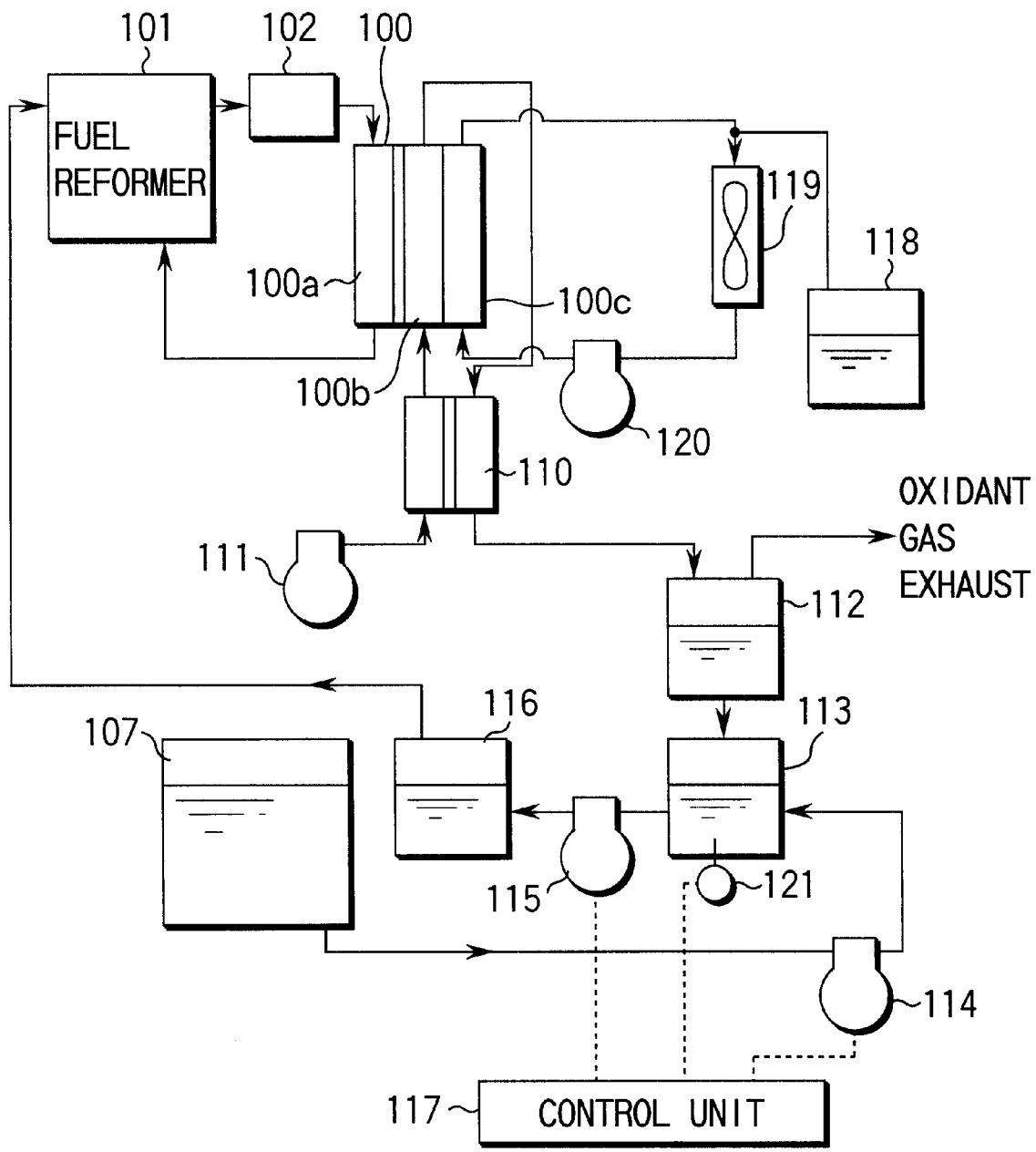
FIG. 2 is a view of a polymer fuel cell system according to a first embodiment of the present invention.

The polymer electrolyte fuel cell system shown in FIG. 2 employs a medium having a low freezing point as a fuel. More specifically, methanol as a liquid fuel stored in a fuel tank 107, is supplied to a mixer 113 by means of a supply pump 114.

In this embodiment, a separator 112 is provided for separating water vapor from an air exhaust by condensing it, and a mixer 113 is provided for mixing the separated water and the medium having a low freezing point (low-freezing point medium).

Methanol as liquid fuel is a medium having a freezing point of 0° C. or less. The freezing point can be lowered by mixing methanol into the water recovered, more specifically, by adding methanol in an amount of 40 wt % or more, in other words, in a methanol/water molar ratio of 1/2.7 or more, the freezing point becomes −40° C. or less.

The mixer 113 is equipped with a sensor 121 for measuring the concentration of methanol which serves not only as the fuel but also as the low-freezing point medium. The supply volume of methanol is controlled by a controller unit 117 in such a way that methanol is contained in the aforementioned amount in the mixer 113.

On the other hand, the solution mixture is directly sent to the evaporator 116, vaporized therein, and then reformed in the reformer 101. Methanol is reformed with water vapor in accordance with the following theoretical equation:

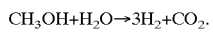

$$CH_3OH+H_2O \rightarrow 3H_2+CO_2.$$

from the above equation, it is found that the molar ratio of methanol to water must be 1:1 or more.

Accordingly, the concentration of methanol contained in the solution mixture is controlled in such a way that the methanol/water molar ratio falls within the range of 1:1 to 1:2.7. The mixer 113 is equipped with the methanol concentration sensor 121. The supply volume of methanol is controlled by the controller unit 117 so as to fall within the aforementioned concentration.

The vapor of the solution mixture is supplied to the reformer 101. The vapor is reformed into a hydrogen-rich gas in the reformer. The hydrogen-rich gas is fed to an anode 100a of the fuel cell stack 100 by way of a CO reducing unit 102. After consumed in a predetermined volume by the cell reaction, the fuel gas containing unreacted hydrogen is fed out from the stack body to a burner of the reformer 101 and used as a heat source for the reformer 101.

The air is supplied by the compressor 111 to a cathode 100b of the fuel cell stack 100 by way of the total enthalpy heat exchanger 110. After consumed in a predetermined volume by the cell reaction, the air include water generated through the cell reaction and is fed out therefrom. The fed-out air is cooled by the total enthalpy heat exchanger 110 while imparting moisture to unreacted air to humidify it.

Figure 3:
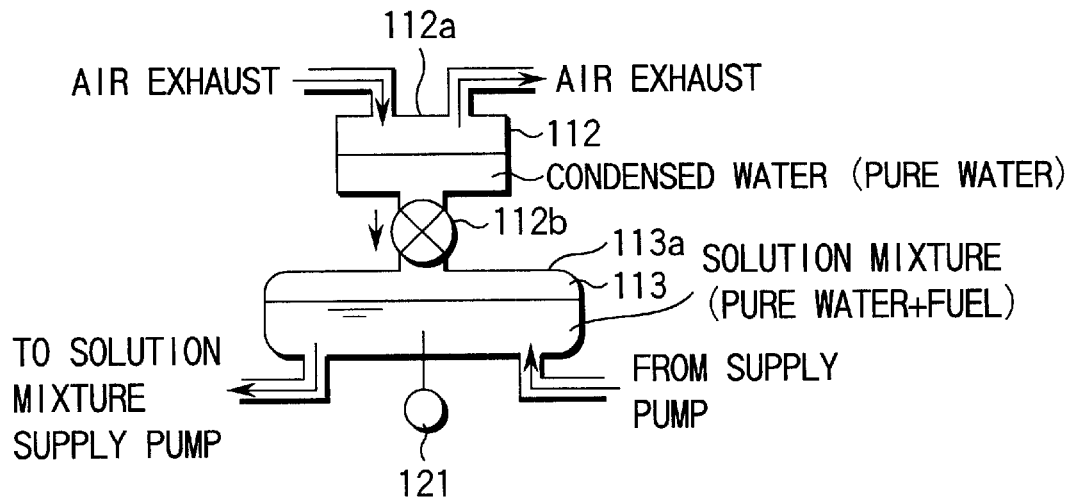
FIG. 3 is a view showing a structure of the separator and the mixer according to the first embodiment.

Referring to FIG. 3, the separator 112 and mixer 113 will be explained more specifically. The separator 112 is a cylindrical container 112a having a gas inlet and a gas outlet in the upper portion thereof. The air is fed out from the fuel cell stack 100 and supplied to the gas inlet. The air herein contains the water resulting from the cell reaction in the state of vapor. Since cooled by the total enthalpy heat exchanger 110, the air is supplied to the container 111a while including the water vapor condensed. The condensed water is stored in the lower portion of the container 112a. In this manner, the condensed water is separated from the oxidant gas.

The condensed water stored in the separator 112 is pure water, so that freezing may occur when the system is stopped. For this reason, it is desirable that the volume of the container 112a of the separator 112 be smaller. To be more specific, the container of the fuel cell system providing a 50 kW electricity is preferred to have a volume of about one-liter.

The mixer 113 is constituted of a container 113a similarly to the separator 112. The container 113a has a pipe from the supply pump 114, a pipe to a solution mixture pump 115, and a concentration sensor 121, in the lower portion thereof.

The separator 112 and the mixer 113 are connected to each other by a quantitative discharge valve 112b. The quantitative discharge valve 112b functions by means of a spring. When a predetermined volume of the condensed water is stored in the separator 112, the valve is opened by its weight to discharge the condensed water.

The quantitative discharge valve 112b is used in this embodiment. However, a magnetic valve and a pump may be used in place of the quantitative discharge valve 112b.

The condensed water thus discharged is mixed with the low-freezing point medium (also serving as the fuel) supplied by the pump 114. There is no possibility that the mixer 113 is frozen when the system is stopped. However, in consideration of weight reduction, it is desirable that the volume of the container 113a be smaller. More specifically, the container of the fuel cell system providing a 50 kW electricity is preferred to have a volume of about 2-liters.

To the cooling plate 100c of the fuel cell stack 100, an antifreeze is supplied by a cooling water pump 120. After the heat due to the cell reaction is removed, the antifreeze is cooled by an electric fan 119 and circulated. An antifreeze reservoir tank 118 is connected to the inlet of the fan 119, in order to control the volume of the antifreeze. As the antifreeze, methanol is used which serves not only as the fuel but also the low-freezing point medium. Alternatively, ethylene glycol may be used, which serves as a medium having a freezing point lower than water as will be described in a later embodiment. If the low-freezing point medium such as ethylene glycol is added to water, the freezing point of water can be reduced. The freezing point is determined depending upon a type of solvent and a mixing ratio of water to the medium. Most preferably, ethylene glycol is added in an amount of about 30 to 50 wt %.

As mentioned above, since the separating means for separating the moisture of the oxidant gas fed from the fuel cell stack, and the mixing means for mixing part of water with the fuel are arranged discretely from each other in this embodiment, the freezing point of the moisture contained in the oxidant gas exhaust can be reduced. It is therefore possible to prevent freezing of moisture. Consequently, the system can be quickly started up even in a below-zero environment. Simultaneously, the fuel is prevented from being exhausted together with the exhaust gas, with the result that a reduction in efficiency of the system can be prevented.

Since the temperature of the oxidant gas exhaust is sufficiently reduced by the total enthalpy heat exchanging means, it is possible to reduce the volume of water vapor condensed in the oxidant gas exhaust flowing passage when the system is stopped. As a result, freezing of moisture within the oxidant gas exhaust flowing passage can be prevented without complicating the system and the control.

Furthermore, since the total enthalpy heat exchanger 110 is used in the present invention, a single methanol supply means is sufficient enough. The system will not be complicated and controlled in a simple manner.

Moreover, in this embodiment, the oxidant gas is not mixed with undiluted methanol serving as a fuel, and the oxidant gas is separated by pure water from the undiluted methanol serving as a fuel. Therefore, a safety means is not required. The system and the control will not be complicated.

Figure 4:
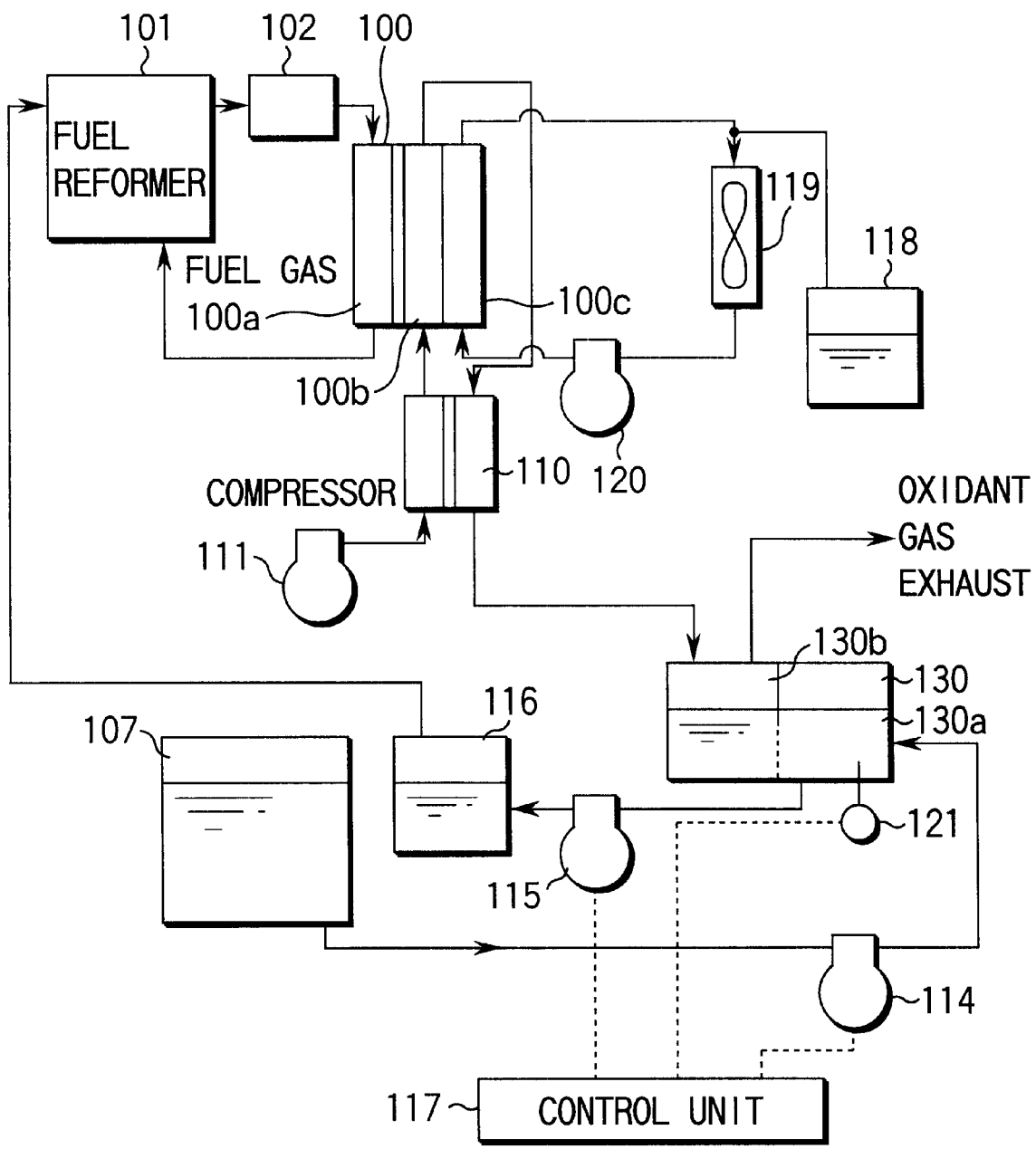
FIG. 4 is a structure of a polymer electrolyte fuel cell system according to a second embodiment of the present invention.

FIG. 4 shows a second embodiment of the present invention. In FIGS. 2 and 3, like reference numerals are used to designate like structural elements. In this embodiment, the separator 112 and the mixer 113 shown in FIG. 2 are integrated into a separator/mixer 130. The structure is designed so as to impart heat of condensation generated in the separator 112, to the mixer 113.

Figure 5:
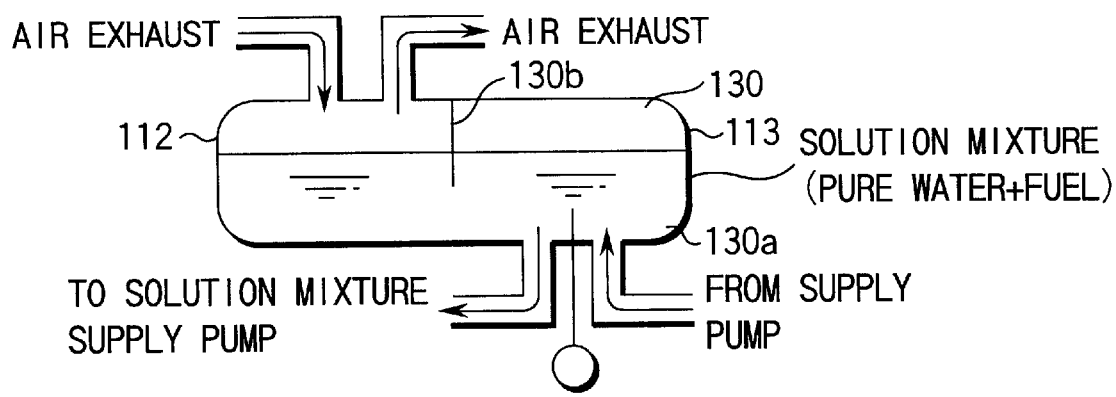
FIG. 5 is a view showing a structure of the separator according to the second embodiment.

FIG. 5 shows a cross sectional view of the separator/mixer 130. The separator/mixer 130 has a container 130a. The separator 112 and the mixer 113 are integrated into one with a partition board 130b interposed between them. The separator 112 has a gas inlet and a gas outlet in the upper portion, in the same as in the first embodiment. Air is fed from the total enthalpy heat exchanger 110 and supplied to the gas inlet. The air contains water resulting from a cell reaction in a vapor state. The vapor is reduced in temperature by the total enthalpy heat exchanger 110, condensed and then supplied to the container. The condensed water is stored in the lower portion of the container. In this manner, the water is separated from the oxidant gas.

The separated pure water is supplied to the mixer through a connecting passage arranged in part of the partition board 130b. The mixer 113 has a pipe from a supply pump 114, a pipe to a solution mixer pump 115, and a concentration sensor 121 in the lower portion thereof. A solution mixture is prepared from the separated water and methanol as a fuel, in the mixer 113. The solution mixture is fed to an evaporator 116 by way of the pump 115, in the same manner as in the first embodiment.

In this embodiment, the separator 112 is provided for separating the moisture contained in the oxidant gas which is exhausted from the total enthalpy heat exchanger 110, and the mixer 113 is provided for mixing part of the moisture with the fuel. With this configuration, the freezing point of the water in the oxidant gas exhaust can be reduced, with the result that the freezing of the water can be prevented. Therefore, the system can be quickly started up even in a below-zero environment. Furthermore, the fuel is prevented from being exhausted together with the exhaust gas. It is therefore possible to prevent a reduction in efficiency of the system.

Since the temperature of the oxidant gas exhaust is sufficiently reduced by the total enthalpy heat exchanging means, the volume of water vapor condensed in the oxidant gas exhaust flowing passage can be reduced when the system is stopped. As a result, the moisture within the oxidant gas exhaust flowing passage can be prevented from freezing without complicating the system and the control.

In addition to the effects mentioned above, this embodiment is effective in raising temperature of the solution mixture because of the presence of separator/mixer which is formed by integrating the separator 112 and the mixer 113 into one. This is because heat such as heat of condensation generated from the separator 112 can be imparted to the solution mixture of the mixer 113. By virtue of this, heat imparted by the evaporator can be reduced in amount. It is therefore possible to improve the efficiency of the system.

Figure 6:
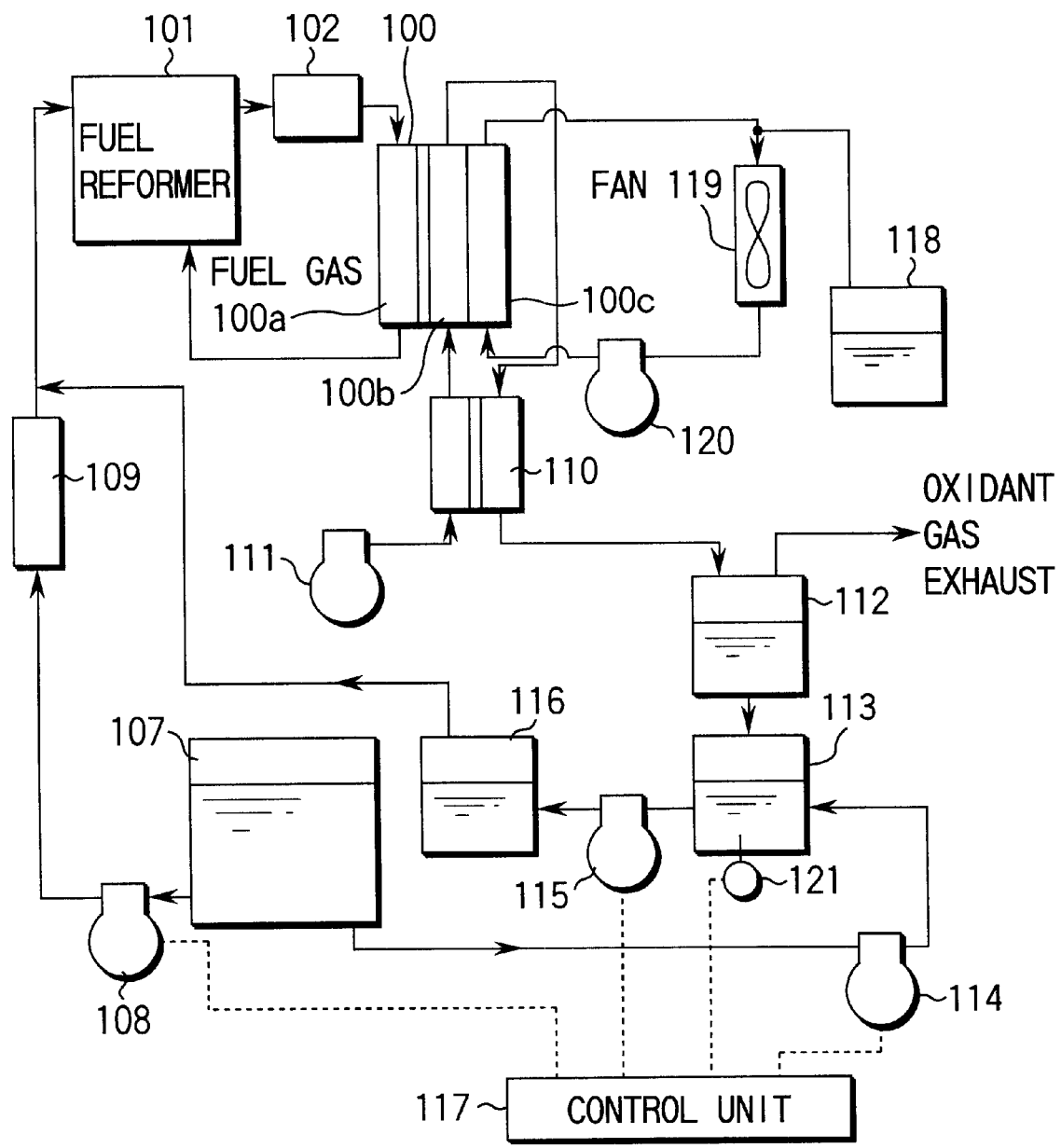
FIG. 6 is a view showing a structure of a polymer electrolyte fuel cell system according to a third embodiment of the present invention.
Figure 7:
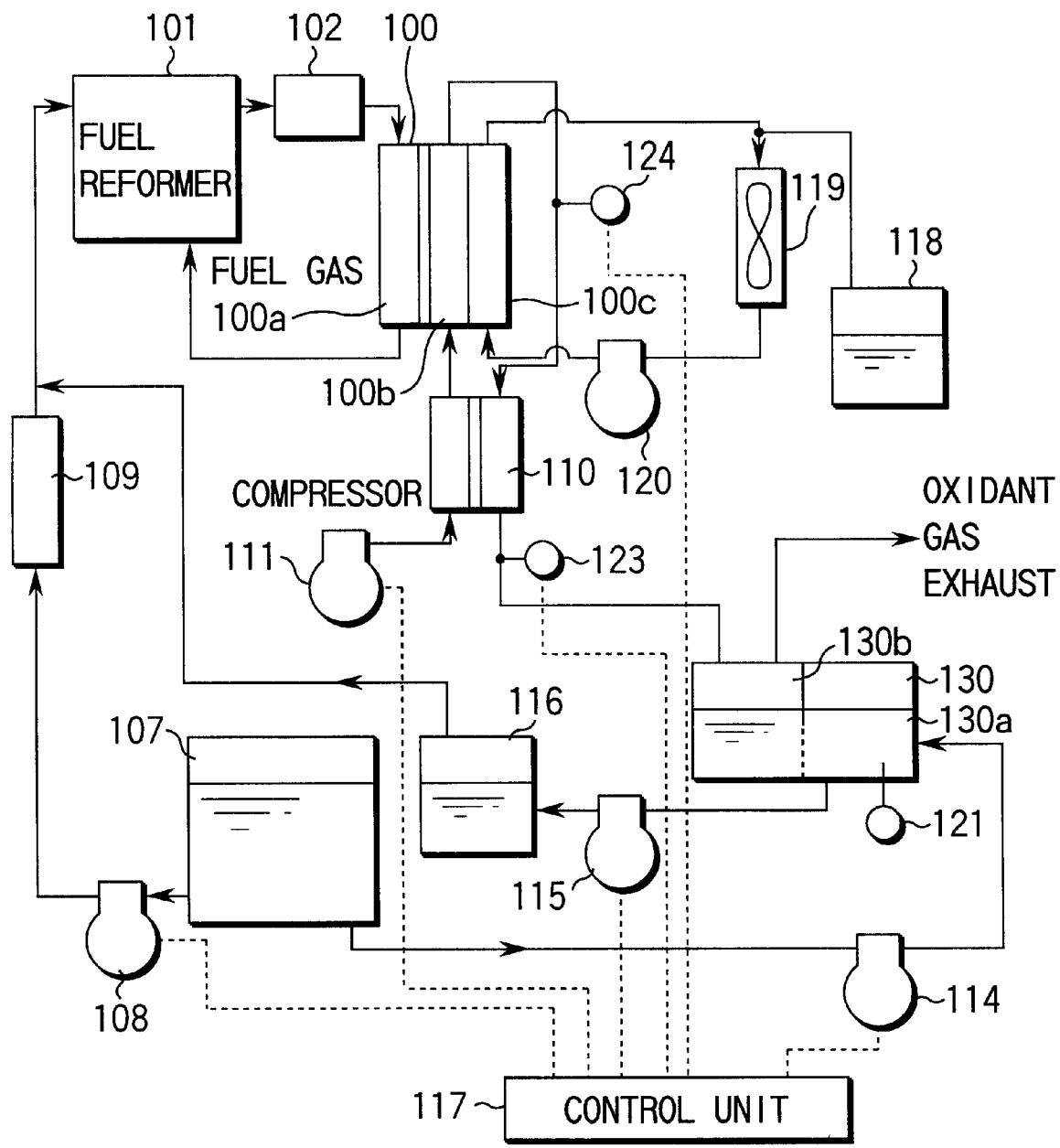
FIG. 7 is a view showing a structure of a polymer electrolyte fuel cell system according to a modified example of the first embodiment of the present invention.

FIGS. 6 and 7 show modified examples of the first and second embodiments of the present invention. In these figures, like reference numerals are used to designate like structural elements corresponding to those in FIGS. 2–5. In this embodiment, a liquid fuel is first mixed with the recovered water to make a solution mixture. The solution mixture thus formed is then sent to a pollution vapor generator 116 by means of a mixing pump 115. Thereafter the vapor of the solution mixture is supplied to a reformer 101. Alternatively, the liquid fuel may be supplied to the reformer by way of a fuel pump 108 and an evaporator 109. This embodiment is preferably applied to an auto-thermal type reformer formed by combining a partial oxidation reformer and a vapor oxidization reformer. More specifically, since a partial oxidation reaction takes place in the auto-thermal type, the volume of water vapor required for reforming the fuel is smaller than in the water-vapor reformer. This means that condensed water resulting from the oxidant gas exhaust can be reduced, so that the separator 112 and the mixer 113 can be reduced in size. On the contrary, the fuel vapor generated by the water vapor generator is reduced. However, the reduction of the fuel vapor can be compensated by the evaporator 109.

The same effects as in the first and second embodiments are obtained in this embodiment. In addition, this embodiment is advantageous since the separator 112 and the mixer 113 are made smaller. This is because the fuel vapor can be produced by the evaporator 109 when the volume of water vapor is insufficient, for example, in the case where the auto thermal type reformer is used.

Figure 8:
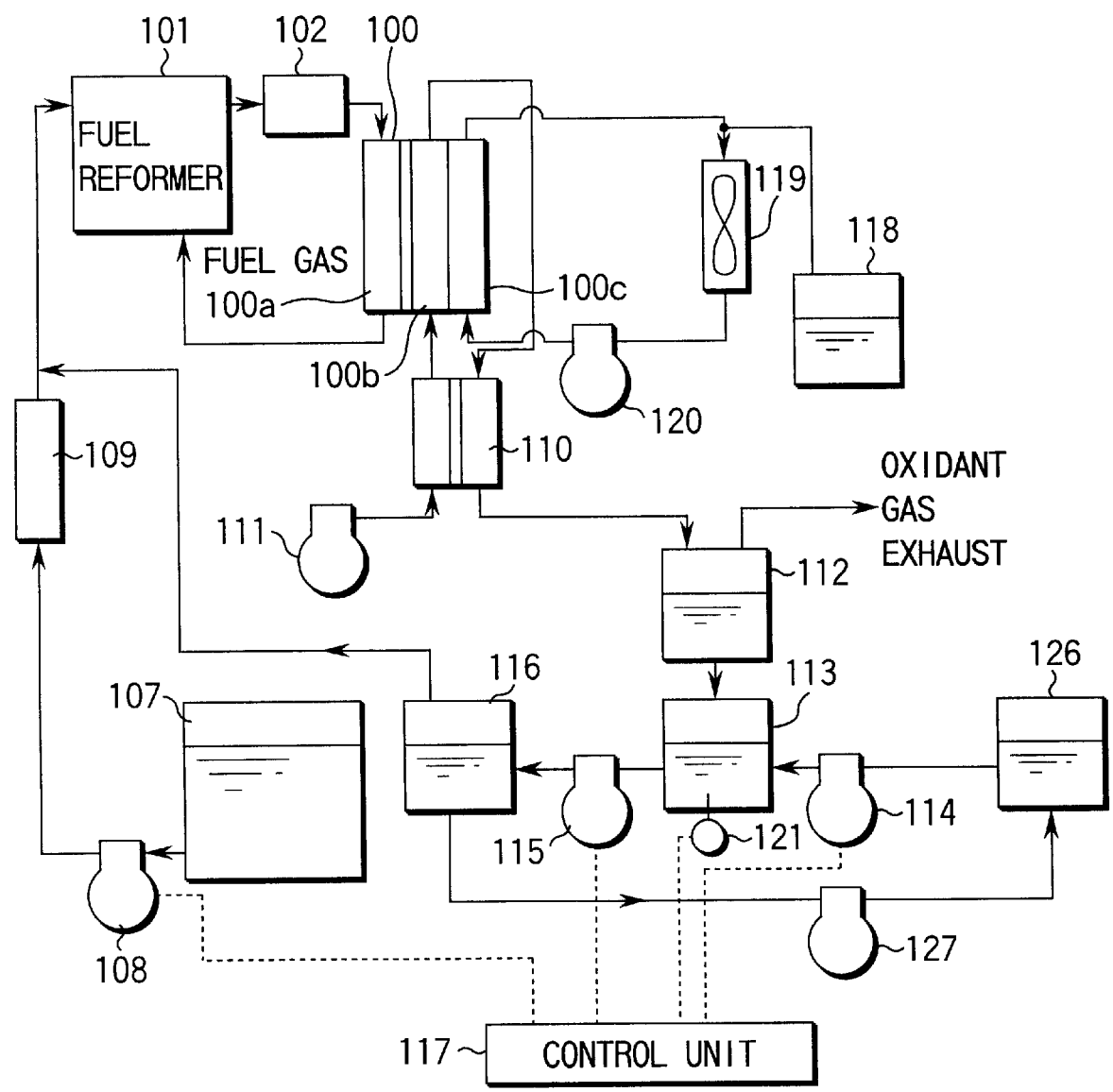
FIG. 8 is a view showing a structure of a polymer electrolyte fuel cell system according to a modified example of the second embodiment of the present invention.

FIG. 8 shows a polymer fuel cell system according to a third embodiment. The fuel cell system uses a medium miscible with the water separated from the air exhaust as the medium having a freezing point of 0° C. or less and a boiling point higher than water. To be more specific, ethylene glycol having a boiling point of about 200° C., is used. In addition, gasoline is used as the liquid fuel.

In FIG. 8, a fuel gas is reformed by a reformer 101 into a hydrogen-rich gas. The reformed gas is fed to an anode 100a of a fuel cell stack 100 by way of a CO removal unit 102. After consumed in a predetermined volume through an electrochemical reaction, the fuel exhaust gas containing unreacted hydrogen is supplied to a burner of the reformer 101 and used as a heat source.

The air supplied by a compressor 111 is passed through a total enthalpy heat exchanger 110 and supplied to an oxidizing pole 100b of the fuel cell stack 100. After consumed in a predetermined volume through the electrochemical reaction, the air recovers water resulting from the electrochemical reaction and exhausted. The exhausted air is cooled by the total enthalpy heat exchanger 110 and gives moisture to unreacted air to humidify it.

In this embodiment, a separator 112 is provided for separating water vapor from the air exhaust by condensing it, and a mixer 113 is provided for mixing the separated water with a low-freezing point medium. The separator 112 and the mixer 113 are the same as those shown in FIG. 3. Ethylene glycol serving as the low freezing point medium is stored in a tank 126. The ethylene glycol is supplied to the mixer 113 by means of a supply pump 114.

The solution mixture stored in the mixer 113 is supplied to a vapor generator 116 by means of a mixing pump 115. In the vapor generator 116, the solution mixture is heated by a heat source (not shown). In this way, the water contained in the solution mixture is vaporized into water vapor. The water-vapor is supplied as the reforming water vapor. A low-freezing point medium in the remaining solution mixture is returned to a tank 126 by a return pump 127. In this embodiment, since ethylene glycol having a boiling point higher than water is used as the low-freezing point medium, only water vapor is generated by the vapor generator 116. In this way, the water vapor can be separated from ethylene glycol.

Freezing may not occur in the mixer when the system is stopped. However, it is desirable that the volume of the container be smaller in consideration of weight reduction. More specifically, the container of the fuel cell system providing a 50 kW electricity is preferred to have a volume of about 2-liters.

To the reformer 101, gasoline as fuel is supplied by way of a fuel pump 108 and the evaporator 109, and then mixed with the water vapor. In this way, the fuel is reformed to obtain a hydrogen rich gas. The ratio of the fuel supply volume and the water vapor supply volume is controlled so as to fall within the range of 1:1 to 1:3. To be more specific, the volumes to be supplied by the fuel pump 108 and the mixing pump 115 are controlled by a controller unit 117 so as to fall within the range. Methanol may be used as the fuel or ethylene glycol may be used as the low freezing point medium.

The fuel cell system providing a 50 kW electricity according to this embodiment and a conventional fuel cell system were operated for a predetermined time. After the systems were stopped, they were left alone at an environment-controlled test room set at −40° C. for one day, followed by subjecting to a driving test.

In the fuel cell system of this embodiment, since an antifreeze was used as the cooling water and the solution mixture, freezing did not occur. Therefore, the reforming water vapor was quickly produced and the system was driven in about one minute. In the separator 112, the remaining condensed water of 500 ml was frozen at the time the system was stopped. However, the frozen water was thawed by latent heat of condensation of the water vapor contained in the air exhaust in about 10 seconds after the system was started again.

Whereas, in the conventional fuel cell system, pure water serving as cooling water is used as the reforming water vapor. Due to the freezing of the cooling water, the system sometimes fails in operation.

As described, the separator 112 is provided for separating the water vapor from the oxidant gas exhaust by condensing it, and the mixer 113 is provided for mixing the separated water and the low-freezing point medium. By virtue of this structure, the freezing point of the water recovered from the oxidant gas can be reduced. It is therefore possible to prevent the freezing of the water even at a temperature of below zero. The system is quickly stated up even in a below-zero environment.

This embodiment is preferably applied to the system employing a water-insoluble fuel. For example, when gasoline is added to water separated from the oxidant gas exhaust as is in the first and second embodiments, it cannot be mixed with the water because gasoline is insoluble in water. As a result, the freezing point of the water cannot be reduced. In this case, if the low-freezing point medium is used aside from the fuel, freezing of the water separated from the oxidant gas exhaust can be prevented even when the water-insoluble fuel such as gasoline is used.

Furthermore, it is possible to generate and separate only water vapor by the vapor generator if a medium having a boiling point higher than water is used as the low-freezing point medium.

Figure 9:
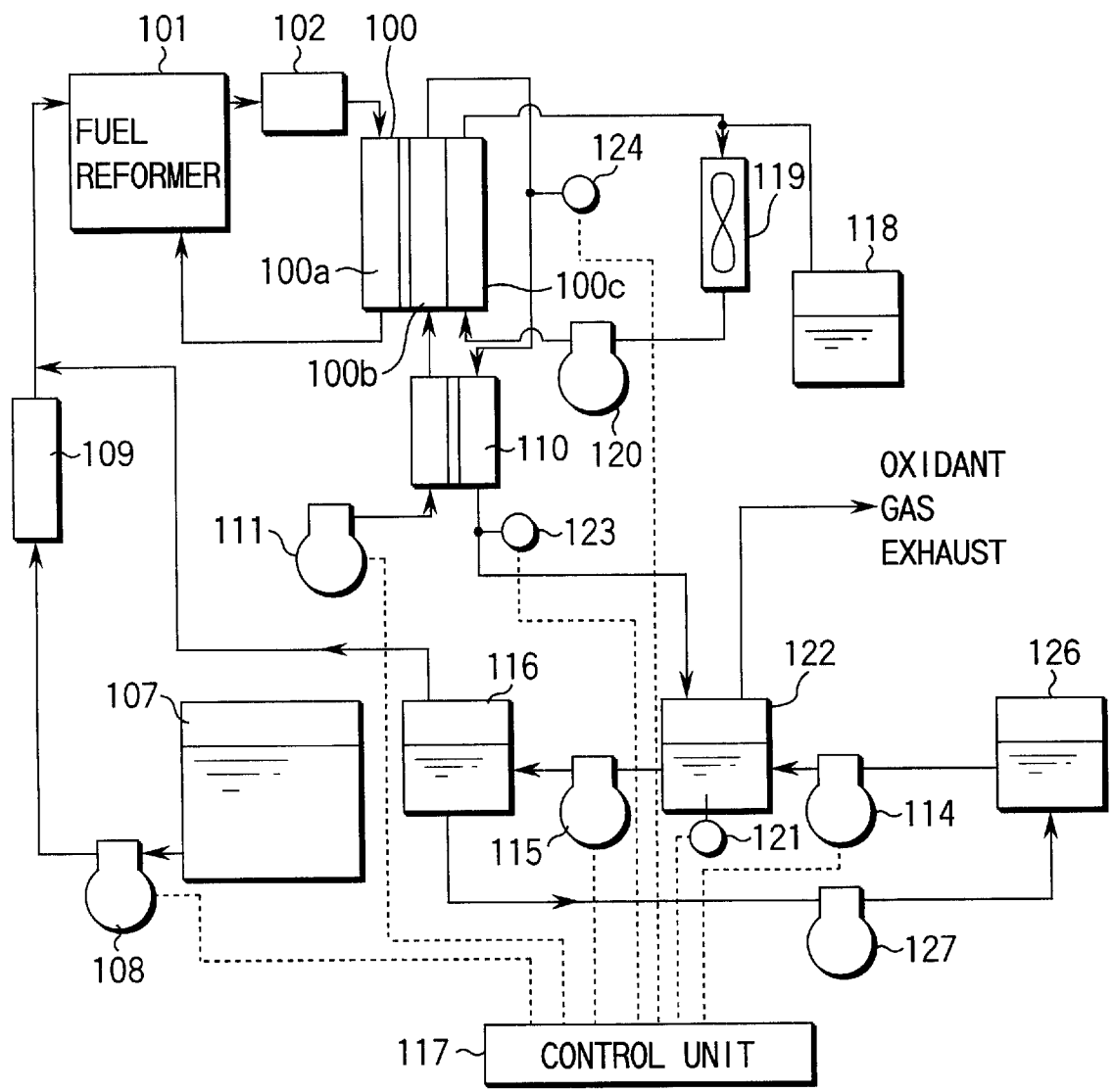
FIG. 9 is a view showing a structure of a polymer electrolyte fuel cell system according to a modified example of the third embodiment of the present invention.

FIG. 9 shows a polymer electrolyte fuel cell system according to a fourth embodiment. In this case, ethylene glycol is used as the low-freezing point medium aside from gasoline serving as a fuel, in the same as in the third embodiment.

Figure 10:
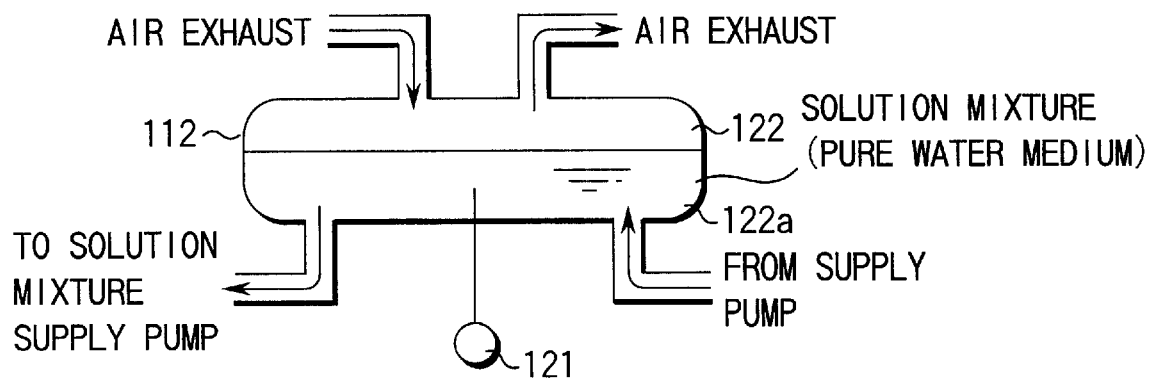
FIG. 10 is a view showing a structure of the separator according to the third embodiment.

In this embodiment, a separator 122 is used as shown in FIG. 10. The separator 122 is formed by integrating the separator 112 and the mixer 113 of the fourth embodiment into one. To describe more specifically, the separator 122 is responsible for separating water vapor from the oxidant gas exhaust by condensing it. The low-freezing point medium is also supplied to the separator 122. Furthermore, to calculate how much the water is condensed in the separator 122, a humidity sensor 124 is provided for a measuring the volume of water vapor in the air exhaust. To measure the temperature of the air exhaust after heat is completely exchanged by the total enthalpy heat exchanger 110, a temperature sensor 123 is provided.

The condensed water separated by the separator 122 is mixed with the low freezing point medium supplied by a supply pump 114. Ethylene glycol having a freezing point lower than water is used as the low-freezing point medium. It is possible to lower the freezing point of water by mixing the low-freezing point medium into water. The freezing point is determined depending upon a type of medium and a mixing ratio of water to the medium. Most preferably, ethylene glycol is added in an amount of 30 to 50 wt %.

The supply volume of ethylene glycol is controlled by a controller unit 117 so as to satisfy the aforementioned concentration. More specifically, the volume of water vapor contained in the air exhaust is first determined on the basis of the supply volume by a compressor 111 and the humidity measured by the humidity sensor 124. Then, the condensation volume of water vapor is calculated from the temperature of the air after heat is completely exchanged by the total enthalpy heat exchanger 110. Subsequently, the supply volume of ethylene glycol serving as the low-freezing point medium is controlled by the controller unit 117 so as to become equal to 43 to 100% of the condensation amount.

The solution mixture stored in the separator 122 is supplied to the vapor generator 116 by means of the mixing pump 115. The solution mixture is heated by a heat source (not shown) in the vapor generator 116 to vaporize the water in the solution mixture. The water vapor thus obtained is supplied as the reforming water vapor. The low-freezing point medium left in the solution mixture is returned to a tank 126 by a return pump 127.

In this embodiment, since ethylene glycol having a boiling point higher than water is used as the low freezing point medium, only water vapor is generated in the vapor generator 116. In this manner, the water vapor is separated from ethylene glycol.

The fuel cell system providing a 50 kw electricity according to this embodiment was operated for a predetermined time. After the cell system was stopped, the fuel cell system was left alone at an environment-controlled test room set at −40° C. for one day, followed by subjecting to a driving test.

In the fuel cell system of this embodiment, since an antifreeze was used as the cooling water and the solution mixture, freezing did not occur. Therefore, the reforming water vapor was quickly generated and the system was driven in about one minute.

As described, the separator 122 is provided for separating the water vapor from the oxidant gas exhaust by condensing it, and the separator 122 is provided for mixing the separated water and the low freezing point medium. As a result, the freezing of the recovered water can be prevented in the same as in the fourth embodiment. The container of the separator 122 can be used as a water tank, so that the structure of the system becomes compact.

This embodiment is preferably applied to the system employing a water-insoluble fuel in the same as in the third embodiment. For example, when gasoline is added to water separated from the oxidant gas exhaust as is in the first and second embodiments, it cannot be mixed with the water because gasoline is insoluble in water. As a result, the freezing point of the water cannot be reduced. In this case, if the low-freezing point medium is used aside from the fuel, freezing of the water separated from the oxidant gas exhaust can be prevented even when the water-insoluble fuel such as gasoline is used.

Furthermore, only water vapor is generated and separated in the vapor generator by using a medium having a boiling point higher than water, as the low-freezing point medium.

Figure 11:
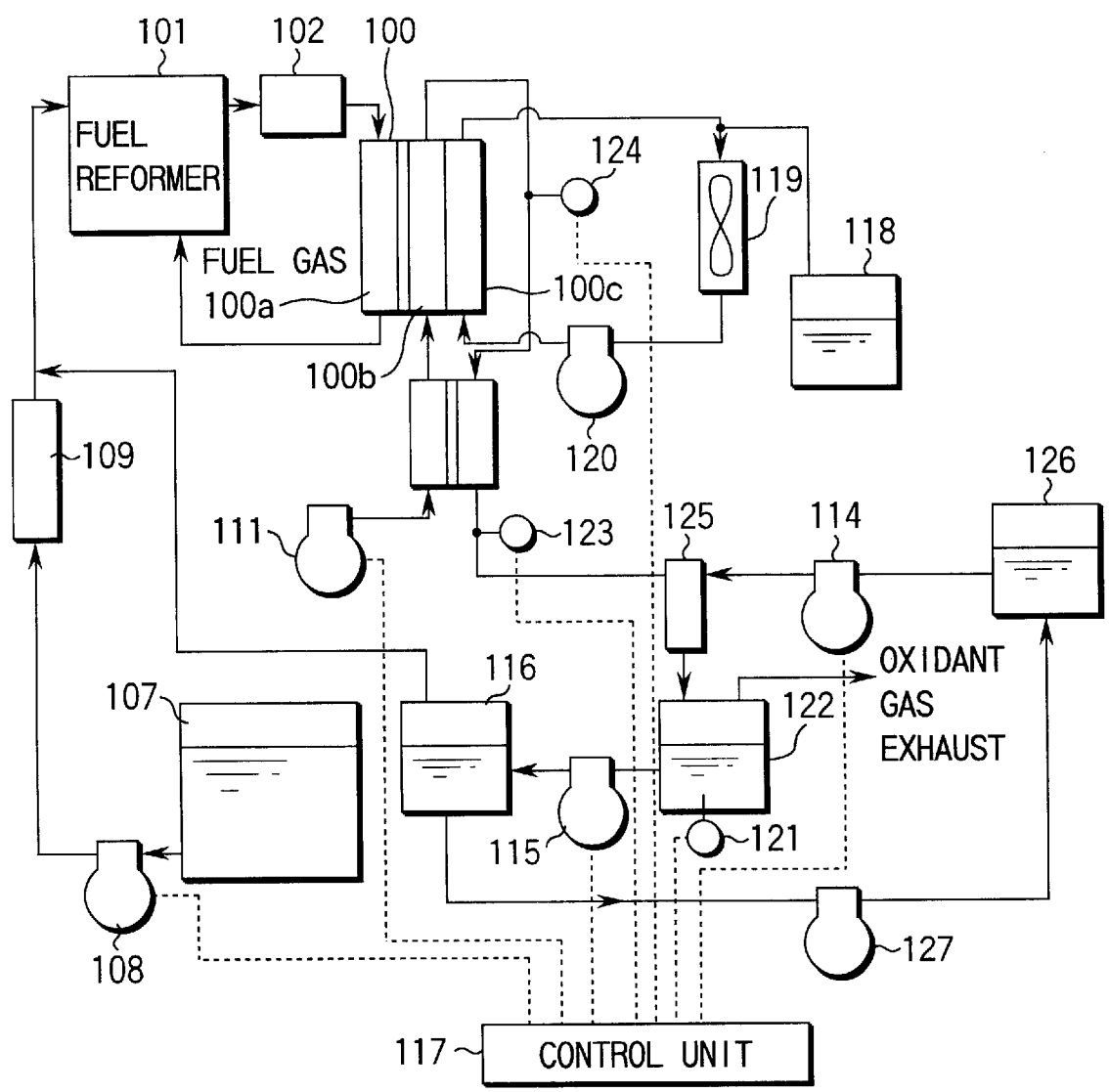
FIG. 11 is a view of a polymer electrolyte fuel cell system according to a fourth embodiment of the present invention.

FIG. 11 shows a polymer electrolyte fuel cell system according to a fifth embodiment. In the fifth embodiment, ethylene glycol is used as the low freezing point medium and gasoline is used as the fuel, in the same as in the third and fourth embodiments.

Figure 12:
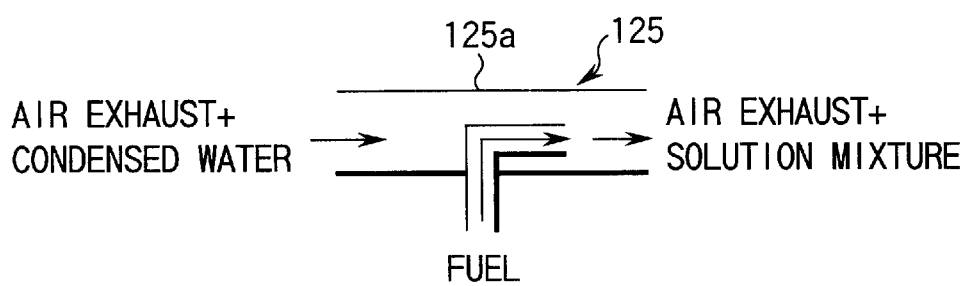
FIG. 12 is a view showing a structure of the separator according to the fourth embodiment.

In this embodiment, a mixer 125 is provided for mixing an oxidant gas exhaust with a medium having a freezing point of 0° C. or less. FIG. 12 shows a cross sectional view of the mixer 125. In the mixer 125 of this embodiment, a pipe is inserted through a wall of an oxidant gas exhaust pipe 125a in such a way that a tip portion of the pipe is set in parallel to a stream of the oxidant gas. The fuel is sprayed into the oxidant gas exhaust by a supply pump 114 to make a solution mixture. The solution mixture and oxidant gas exhaust are supplied into a separator 122. The solution mixture is stored in a lower portion thereof. The separator has the same shape as in the first embodiments 1 and 3.

As the low freezing point medium, the medium having a freezing point lower than water, e.g., ethylene glycol, is used. It is possible to lower the freezing point of water by mixing the low-freezing point medium into water. The freezing point is determined depending upon a type of medium and a mixing ratio of water to the medium. Most preferably, ethylene glycol is contained in an amount of 30 to 50 wt %.

To obtain the aforementioned concentration, the supply volume of ethylene glycol is controlled by a controller unit 117. To be more specific, the amount of water vapor contained in the air exhaust is first determined on the basis of the supply volume by a compressor 111 and the humidity measured by the humidity sensor 124. Then, the condensation volume of water vapor is calculated from the temperature of the air after heat is exchanged by a total enthalpy heat exchanger 110. Subsequently, the supply volume of ethylene glycol is controlled by the controller unit 117 so as to become equal to 43% to 100% of the condensation amount.

The solution mixture stored in the separator 122 is supplied to a vapor generator 116 by a mixing pump 115. In the vapor generator 116, the solution mixture is heated by a heat source (not shown). Water contained in the solution mixture is vaporized into a vapor. The vapor thus obtained is supplied as the reforming water vapor. The low-freezing point medium in the remaining solution mixture is returned by a returning pump 127 into a tank 126.

In this embodiment, since ethylene glycol which has a boiling point higher than water is used as the low freezing point medium, only water vapor is generated by the vapor generator 116. In this manner, the water can be separated from ethylene glycol.

The fuel cell system of this embodiment providing a 50 kW electricity was operated for a predetermined time. After the system was stopped, it was left alone in an environment-controlled test room set at −40° C. for one day, followed by subjecting to a driving test.

In the fuel cell system of this embodiment, an antifreeze was used as the cooling water and the solution mixture, freezing did not occur. Therefore, the reforming water vapor was quickly generated and the system was driven in about one minute.

As described, since the mixer 125 for mixing oxidant gas exhaust with the medium having a freezing point of 0° C. or less, is provided in this embodiment, it is possible to prevent freezing of the recovered water.

This embodiment is preferably applied to the system employing a water-insoluble fuel, in the same as in the third embodiment. For example, when gasoline is added to water separated from the oxidant gas exhaust as is in the first and second embodiments, it cannot be mixed with the water because gasoline is insoluble in water. As a result, the freezing point of the water cannot be reduced. In this case, if the low-freezing point medium is used aside from the fuel, freezing of the water separated from the oxidant gas exhaust can be prevented even when the water-insoluble fuel such as gasoline is used.

Furthermore, if the medium having a boiling point higher than water is used as the low-freezing point medium, it is possible to generate and separate only water vapor in the vapor generator.

Figure 13:
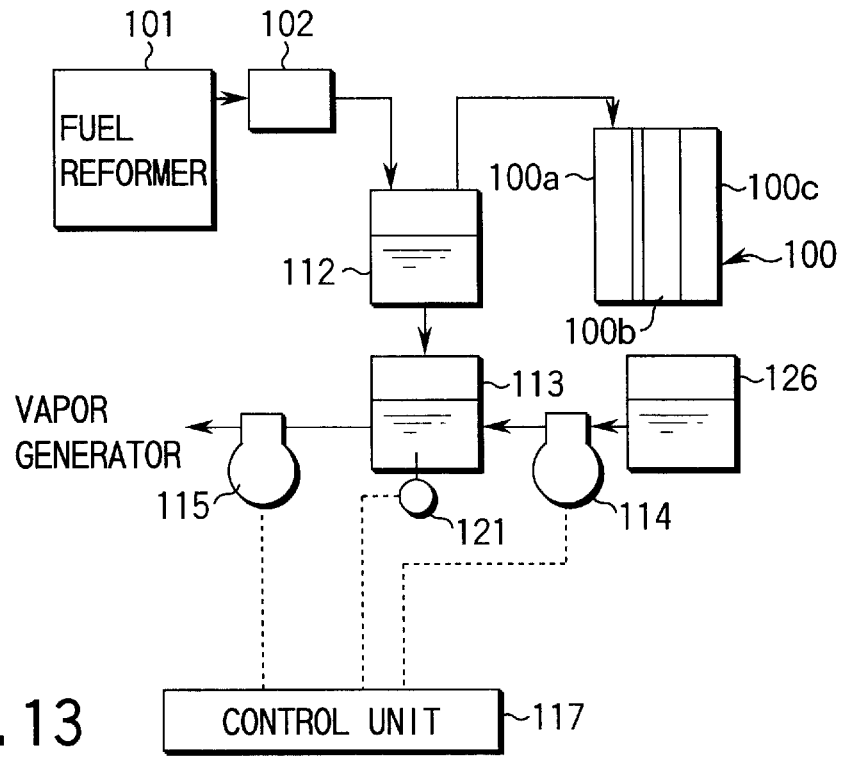
FIG. 13 is a view of a polymer electrolyte fuel cell system according to a fifth embodiment of the present invention.

FIG. 13 shows a fuel cell system according to a sixth embodiment. Of the entire system, this figure particularly shows a pathway from a fuel reformer 101 to an anode 100a of a fuel cell stack 100. Other systems including air supply system, air exhaust system, and cooling system, are the same as those shown in the first and second embodiments.

In this embodiment, a separator 112 is provided for separating water vapor from the reformed gas fed from a fuel reformer 101. A mixer 113 is provided for mixing the separated water with a medium having a freezing point of 0° C. or less.

The separator for separating water vapor and the mixer 113 for mixing a low-freezing point medium are the same as in the fourth embodiment.

The reformed gas contains excess water generated by a reforming reaction in the vapor state. However, the water vapor is lowered in temperature by a heat exchanger (not shown) and supplied to a container in a condensed state. The condensed water is stored in a lower portion of the container. In this manner, the water is separated from the reformed gas.

The low-freezing point medium is supplied by means of a supply pump 114 through a pipe. A pipe is connected to a lower portion of a cylindrical container of the separator 112. The low freezing point medium is supplied by way of the supply pump 114. The condensed water separated is mixed with the low-freezing point medium supplied by the supply pump 114.

When methanol is used as a fuel, methanol is used as the low freezing point medium. When gasoline is used as a fuel, ethylene glycol is used as the low freezing point medium.

To obtain the aforementioned concentration, the supply volume of ethylene glycol is controlled by a controller unit 117. The solution mixture stored in the mixer 113 is supplied to a vapor generator 116 by a mixing pump 115.

The embodiment can be effectively applied to the system in which water vapor is recovered from the reformed gas. More specifically, if the reforming operation is performed under the following operation conditions: gas pressure of 0.1 Mpa or more, a hydrogen utilization rate of 80% or less, an operation temperature of 70° C. or less, and a molar ratio of methanol to water: 1:2.7 or more in the reforming reaction of methanol with water vapor, water vapor is condensed near a fuel supply port.

When water is recovered from the reformed gas, it is possible to prevent freezing of the recovered water by providing the separator for separating water vapor from the reformed gas fed from the fuel reformer 101 and the mixer for mixing the separated water with the medium having a freezing point of 0° C. or less.

Figure 14:
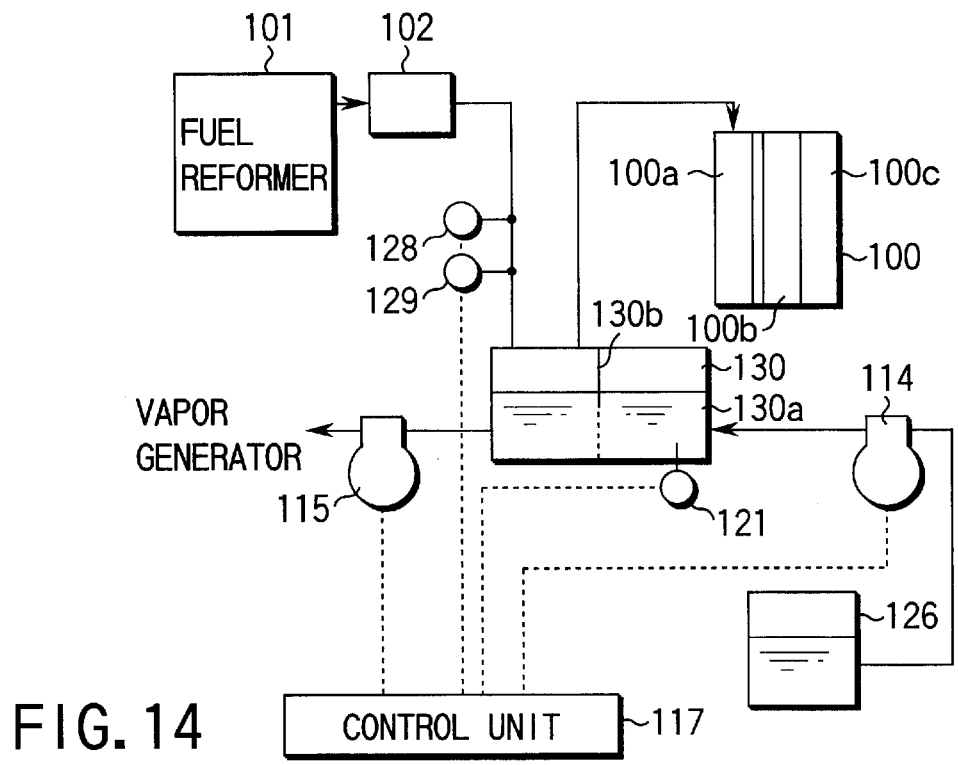
FIG. 14 is a view of a polymer electrolyte fuel cell system according to a sixth embodiment of the present invention.

FIG. 14 shows a fuel cell system according to a seventh embodiment. Of the entire system, this figure particularly shows a pathway from a fuel reformer 101 to an anode 100a of a fuel cell stack 100. Other systems including an air supply system, air exhaust system, and cooling system are the same as those shown in the first and second embodiments.

In this embodiment, a separator/mixer 130 is used in the same as in FIGS. 4 and 5. The separator/mixer 130 is formed by integrating the separator 112 and the mixer 113 shown in FIG. 13. The condensation heat generated from the separator 112 is given to the mixer 113.

The reformed gas contains an excess water generated in a reforming reaction in a vapor state. However, the water vapor is lowered in temperature by a heat exchanger (not shown) and supplied to a container of the separator 112 in a condensed state. The condensed water is stored in a lower portion of the container of the separator 112. In this manner, the water vapor is separated from the reformed gas.

The condensed water separated is mixed with a low freezing point medium supplied by a supply pump 114. As the low-freezing point medium, a medium having a freezing point lower than that of water, such as ethylene glycol, is used. If the low-freezing point medium is mixed into water, the freezing point of water can be lowered. The freezing point can be determined depending upon a type of medium and a mixing ratio of water to the medium. Ethylene glycol is most preferably is contained in an amount of 30 to 50 wt %.

To obtain the concentration, the supply volume of ethylene glycol is controlled by a controller unit 117. To be more specific, the amount of vapor contained in the reformed gas is first determined on the basis of the humidity and temperature measured by a humidity sensor 128 and a temperature sensor 129. Then the condensation volume of the water vapor is calculated from the temperature of the reformed gas. Subsequently, the supply volume of ethylene glycol is controlled by the controller unit 117 so as to become equal to 43% to 100% of the condensation amount. The solution mixture stored is supplied to a vapor generator 116 by a mixing pump 115.

The embodiment can be effectively applied to the system in which water vapor is recovered from the reformed gas. More specifically, if the reforming operation is performed under the following operation conditions: gas pressure of 0.1 Mpa or more, a hydrogen utilization rate of 80% or less, an operation temperature of 70° C. or less, and a molar ratio of methanol to water: 1:2.7 or more in a reforming reaction of methanol with water, water vapor is condensed near a fuel supply port.

When water is recovered from the reformed gas, freezing of the recovered water can be prevented by supplying the low-freezing point medium to a separator/mixer 130 for separating water vapor from a reformed gas fed from a fuel reformer 101 by condensing it.

In addition to this advantage, since a separator/mixer 130 is used which is formed by integrating a separator 112 and a mixer 113, it is possible to give heat such as condensation heat generated from the separator 112 to a solution mixture contained in the mixer 113. Therefore, the temperature of the solution mixer is increased and the amount of heat given by an evaporator can be reduced. Consequently, the efficiency of the system can be improved.

Figure 15:
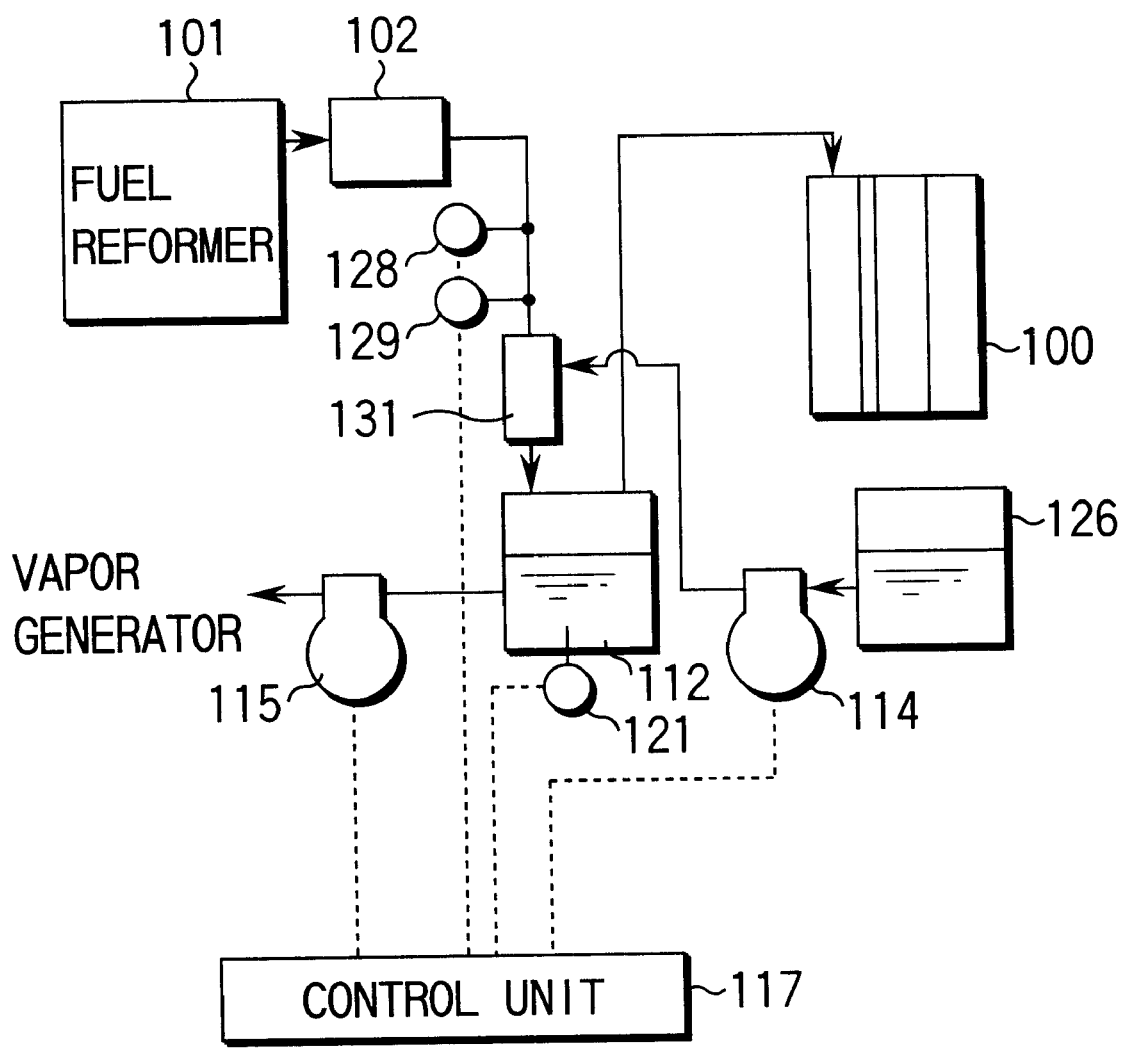
FIG. 15 is a view of a polymer electrolyte fuel cell system according to a seventh embodiment of the present invention.

FIG. 15 shows a fuel cell system according to an eighth embodiment. Of the entire system, this figure particularly shows a pathway from a fuel reformer to an anode of a fuel cell stack. Other systems including an air supply system, air exhaust system, and cooling system are the same as those in the first and second embodiments. In this embodiment, a mixer 131 is provided for mixing a reformed gas with a medium having a freezing temperature of 0° C. or less. The mixer 131 is the same as the mixer 125 of the fifth embodiment.

In the mixer 129 of this embodiment, a pipe is inserted through a wall of a reformed gas pipe in such a way that a tip portion of the pipe is set in parallel to a gas stream of the reformed gas. The low-freezing point medium is sprayed into the reformed gas by a supply pump 114 to make a solution mixture.

The solution mixture and reformed gas are supplied into a separator 112. The solution mixture is stored in the lower portion. The separator 112 has the same shape as shown in the fifth embodiment. The pipe for supplying a low-freezing point medium is now shown in this case.

As the low freezing point medium, the medium having a freezing point lower than that of water, e.g., ethylene glycol, is used. It is possible to lower the freezing point by mixing the low-freezing point medium into water. The freezing point is determined depending upon a type of medium and a mixing ratio of water to the medium. Ethylene glycol is most preferably contained in an amount of 30 to 50 wt %.

To obtain the concentration, the supply volume of ethylene glycol is controlled by a controller unit 117. To be more specific, the amount of water vapor contained in a reformed gas is first determined on the basis the humidity measured by the humidity sensor 128. Then, the condensation volume of the water vapor is calculated from the temperature of the reformed gas. Subsequently, the supply volume of ethylene glycol is controlled by the controller unit 117 so as to become equal to 43% to 100% of the condensation amount.

The solution mixture stored in the mixer 131 is supplied to a vapor generator 116 by a mixing pump 115.

The embodiment can be effectively applied to the system in which water vapor is recovered from the reformed gas. More specifically, if the reforming operation is performed under the following operation conditions: gas pressure of 0.1 Mpa or more, a hydrogen utilization rate of 80% or less, an operation temperature of 70° C. or less, and a molar ratio of methanol to water: 1:2.7 or more in a reforming reaction of methanol with water, water vapor is condensed near a fuel supply port.

When water is recovered from the reformed gas, freezing of the recovered water can be prevented by providing the mixer 131 for mixing the reformed gas fed from a fuel reformer 101 with a medium having a freezing point of 0° C. or less.

As described above, the polymer electrolyte fuel cell system of the present invention comprises a fuel reformer for reforming a fuel having a freezing point of below zero with water vapor by supplying the fuel and the water vapor to the reformer, the fuel reformed being supplied to a fuel cell stack;

total enthalpy heat exchanging means for exchanging heat and moisture between a reacted gas fed from a reaction section of the fuel cell stack and an unreacted gas to be fed to the reaction section of the fuel cell stack;

separating means for separating the moisture from the reacted gas fed from the total enthalpy heat exchanging means;

mixing means for mixing part of the moisture fed from the separating means, with the fuel;

fuel supply means for supplying the fuel to the mixing means; and solution mixture supply means for supplying part of the solution mixture prepared by the mixing means to the fuel reformer.

According to the present invention, the fuel, which is fed to the reformer, is also used as the medium having a freezing point of 0° C. or less. It is therefore possible to prevent freezing of the moisture within the system even at a below-zero temperature. It follows that the system can be quickly started up even under a below-zero environment.

Furthermore, the separating means for separating the moisture from an exhaust gas and the mixing means for mixing part of the water with the fuel are discretely arranged herein. It is therefore possible to prevent the system from decreasing in efficiency.

Furthermore, the total enthalpy heat exchanging means is provided herein for exchanging heat and moisture between a reacted gas fed from a reaction section of the fuel cell stack and an unreacted gas before feeding to the reaction section of the fuel cell stack. It is therefore possible to sufficiently decrease the temperature of the exhaust gas of the fuel cell stack, with the result that condensation of the water vapor within the exhaust gas flowing passage can be prevented.

According to another aspect of the present invention, the polymer electrolyte fuel cell system comprises a fuel reformer for reforming a fuel with water vapor by supplying the fuel and the water vapor to the fuel reformer, the fuel reformed being supplied to the fuel cell stack;

total enthalpy heat exchanging means for exchanging heat and moisture between a reacted gas fed from a reaction section of the fuel cell stack and an unreacted gas to be fed to the reaction section of the fuel cell stack;

solution mixture preparing means for preparing a solution mixture of water in the reacted gas fed from the total enthalpy heat exchanging means and a medium having a freezing point of 0° C. or less and a boiling point higher than water; and water vapor generating means for generating water vapor from the solution mixture prepared by the solution mixture preparing means.

According to the present invention, the water vapor is separated from the fuel gas fed from the fuel cell stack or the oxidant gas. At least part of the moisture thus separated is mixed with the medium having a freezing point of below zero and a boiling point higher than that of water. It is therefore possible to decrease the freezing point of the separated moisture. Since a medium having a boiling point higher than that of water, the medium can be prevented from being exhausted from the separator together with the exhaust gas. Moreover, since the fuel and the medium are separately supplied, freezing of water can be prevented even in the system using a water-insoluble fuel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polymer electrolyte fuel cell system comprising a polymer electrolyte fuel cell stack;

a fuel tank for storing a fuel having a freezing point of 0° C. or less;

a fuel reformer for reforming the fuel fed from the fuel tank with water vapor by supplying the fuel and the water vapor to the fuel reformer, the fuel reformed being supplied to the fuel cell stack;

total enthalpy heat exchanging means for exchanging heat and moisture between a reacted gas fed from a reaction section of the fuel cell stack and an unreacted gas to be fed to the reaction section of the fuel cell stack;

a separator/mixer having a container and a partition board provided in the container so as to form a separator portion and a mixer portion, wherein the separator portion has a gas inlet and a gas outlet, a gas inlet supplies the reacted gas fed from the total enthalpy heat exchanging means to the inside of the container, the container separates condensed water in accordance with the moisture from the reacted gas and the condensed water is stored in the container, the gas outlet exhausts the reacted gas separated from the moisture in the container to the outside of the container, and the mixer portion for mixing the condensed water with the fuel fed from the fuel tank;

solution mixture supply means for supplying part of the solution mixture prepared by the mixer portion to the fuel reformer.

2. A polymer electrolyte fuel cell system comprising a polymer electrolyte fuel cell stack;

a fuel tank for storing a fuel;

a low freezing point medium tank for storing a medium having a freezing point of 0° C. or less and a boiling point higher than that of water;

a fuel reformer for reforming the fuel with water vapor by supplying the fuel fed from the fuel tank and the water vapor to the fuel reformer, the fuel reformed being supplied to the fuel cell stack;

total enthalpy heat exchanging means for exchanging heat and moisture between a reacted gas fed from a reaction section of the fuel cell stack and an unreacted gas to be fed to the reaction section of the fuel cell stack;

a separator having a first container, a gas inlet and a gas outlet, wherein the gas inlet supplies the reacted gas fed from the total enthalpy heat exchanging means to the inside of the first container, the first container separates condensed water in accordance with the moisture from the reacted gas and the condensed water is stored in the first container, the gas outlet exhausts the reacted gas separated from the moisture in the first container to the outside of the first container;

a valve provided at the first container, for discharging a predetermined volume of the condensed water stored in the first container;

a mixer having a second container connected to the separator via the valve, for mixing the predetermined volume of the condense water from the valve with the medium fed from the low freezing point medium tank; and solution mixture supply means for supplying part of the solution mixture prepared by the mixer to the fuel reformer.

3. A polymer electrolyte fuel cell system comprising a polymer electrolyte fuel cell stack;

a fuel tank for storing a fuel;

a low freezing point medium tank for storing a medium having a freezing point of 0° C. or less and a boiling point higher than that of water;

a fuel reformer for reforming the fuel with water vapor by supplying the fuel fed from the fuel tank and the water vapor to the fuel reformer, the fuel reformed being supplied to the fuel cell stack;

total enthalpy heat exchanging means for exchanging heat and moisture between a reacted gas fed from a reaction section of the fuel cell stack and an unreacted gas to be fed to the reaction section of the fuel cell stack;

a separator having a container, a separating portion and a mixing portion, the separating portion having a gas inlet and a gas outlet, wherein the gas inlet supplies the reacted gas fed from the total enthalpy heat exchanging means to the inside of the container, the container separates condensed water in accordance with the moisture from the reacted gas and the condensed water is stored in the container, the gas outlet exhausts the reacted gas separated from the moisture in the container to the outside of the container, and the mixing portion for mixing the condensed water with the medium fed from the low freezing point medium tank; and solution mixture supply means for supplying part of the solution mixture prepared by the mixing portion to the fuel reformer.

4. A polymer electrolyte fuel cell system comprising a polymer electrolyte fuel cell stack;

a fuel tank for storing a fuel;

a low freezing point medium tank for storing a medium having a freezing point of 0° C. or less and a boiling point higher than that of water;

a fuel reformer for reforming the fuel with water vapor by supplying the fuel fed from the fuel tank and the water vapor to the fuel reformer, the fuel reformed being supplied to the fuel cell stack;

total enthalpy heat exchanging means for exchanging heat and moisture between a reacted gas fed from a reaction section of the fuel cell snack and an unreacted gas to be fed to the reaction section of the fuel cell stack;

a mixer mixing the reacted gas fed from the total enthalpy heat exchanging means with the medium fed from the low freezing point medium tank and generating a solution mixture;

a separator having a container, a gas inlet and a gas outlet, wherein the gas inlet supplies the solution mixture and the reacted gas fed from the mixer to the inside of the container, the container stores the solution mixture, the gas outlet exhausts the reacted gas in the container to the outside of the container; and solution mixture supply means for supplying part of the solution mixture prepared by the separator to the fuel reformer.

5. A polymer electrolyte fuel cell system comprising a polymer electrolyte fuel cell stack;

a fuel tank for storing a fuel;

a fuel reformer for reforming the fuel fed from the fuel tank and the water vapor to the fuel reformer, the fuel reformed being supplied to the fuel cell stack;

total enthalpy heat exchanging means for exchanging heat and moisture between a reacted gas fed from a reaction section of the fuel cell stack and an unreacted gas to be fed to the reaction section of the fuel cell stack;

a low freezing point medium tank for storing a medium having a freezing point of 0° C. or less and a boiling point higher than that of water;

separating means arranged between the fuel reformer and the fuel cell stack, for separating moisture from the exhaust gas from the fuel reformer and generating a water vapor by the moisture;

mixing means for mixing part of the water vapor from the separating means and the medium fed from the low freezing point medium tank, thereby generating a solution mixture so as to supply the fuel reformer fuel supply means; and solution mixture supply means for supplying part of the solution mixture prepared by the mixing means to the fuel reformer.

6. The polymer electrolyte fuel cell system according to claim 5, wherein the separating means and the mixing means are integrated into one.

* * * * *